United States Patent [19]

Ikegaya et al.

[11] Patent Number: 4,986,514
[45] Date of Patent: Jan. 22, 1991

[54] SEAT RECLINING DEVICE

[75] Inventors: Isao Ikegaya; Tadashi Matsumoto; Kunihisa Sugimoto, all of Shizuoka, Japan

[73] Assignee: Fujikiko Kabushiki Kaisha, Tokyo, Japan

[21] Appl. No.: 422,403

[22] Filed: Oct. 16, 1989

[30] Foreign Application Priority Data

Oct. 31, 1988 [JP] Japan .............. 63-141181[U]
Jan. 31, 1989 [JP] Japan .............. 1-10070[U]

[51] Int. Cl.⁵ .............................................. B60N 1/06
[52] U.S. Cl. .................................... 297/362; 297/330
[58] Field of Search .................... 297/362, 361, 330

[56] References Cited

U.S. PATENT DOCUMENTS

| 3,401,979 | 9/1968 | Putsch . | |
|---|---|---|---|
| 4,225,182 | 9/1980 | Werner | 297/362 |
| 4,309,015 | 1/1982 | Mühr | 297/330 X |
| 4,521,055 | 6/1985 | Fudala | 297/330 X |
| 4,781,416 | 11/1988 | Johnson et al. | 297/362 |
| 4,832,403 | 5/1989 | Tomita | 297/330 |
| 4,880,274 | 11/1989 | Ichikawa | 297/362 |

FOREIGN PATENT DOCUMENTS

| 56-103253 | 8/1981 | Japan . |
|---|---|---|
| 58-185947 | 12/1983 | Japan . |
| 59-115948 | 8/1984 | Japan . |
| 60-48846 | 4/1985 | Japan . |
| 60-163058 | 10/1985 | Japan . |

Primary Examiner—Peter A. Aschenbrenner
Attorney, Agent, or Firm—Thomas & Kerr

[57] ABSTRACT

To minimize the width of a seat reclining device provided with a Taumel mechanism (planetary gear type angle adjusting mechanism), a motor unit is disposed on an inside surface of a base frame and within a seat cushion, and a motor output gear is disposed on an opposite outside surface of the base frame. Further, an outer gear of Taumel mechanism is formed in the base frame; an inner gear of the Taumel mechanism is formed in a reclining arm in mesh with the outer gear; and the reclining arm is disposed on the inside surface of the base frame and the reclining gear is disposed on the opposite outside surface of the base frame. Further, a shock absorbing member is disposed at the reclining gear to effectively absorb shock generated when the seat back is tilted to its extreme position stoppers.

5 Claims, 6 Drawing Sheets

SEAT RECLINING DEVICE

BACKGROUND OF THE INVENTION

1. Field of the Invention

The present invention relates generally to a seat reclining device for automotive vehicle seats and more specifically to a motor-driven seat reclining device provided with a Taumel mechanism (planetary gear type angle adjusting mechanism).

2. Description of the Prior Art

In a seat reclining device of motor driven type called a power seat, a large gear reduction ratio can be obtained by use of a Taumel mechanism or a planetary gear type angle adjusting mechanism. This mechanism is disclosed in U.S. Pat. No. 3,401,979 by way of example, which is incorporated herein by reference. The prior-art seat reclining device usually comprises at least one base frame fixed on one side of a seat cushion; a reclining arm pivotally supported by the base frame via a Taumel mechanism with its reclining arm end fixed to one side of a seat back; a motor unit mounted on the base frame to drive the reclining arm via the Taumel mechanism; and a reclining gear fixed to one axle end of the Taumel mechanism and driven by the motor unit via a pinion attached to a reduction gear of the motor unit.

In the prior-art seat reclining device, the reclining arm, the reclining gear, the Taumel mechanism, etc. are arranged on the outside surface of the base frame together with the motor unit as disclosed in Japanese Published Unexamined (Kokai) Utility Model Appli. Nos. 56-103253, 60-48846 and 60-163058 or on the inside surface of the reclining arm together with the motor unit as disclosed in Japanese Published Unexamined (Kokai) Utility Model Appli. Nos. 58-185947 and 59-115948. Therefore, there exist problems in that the width of the seat provided with the reclining device is large and further it is rather difficult to fully trim the vehicle seat for improvement in external appearance. In addition, where various power devices (driven by motors) are required for small-sized passenger cars there exists another problem in that it is difficult to mount a magazine rack, a door arm rest, a window power device, etc. within the passenger compartment, because a space between a vehicle door and a seat side is too narrow.

SUMMARY OF THE INVENTION

With these problems in mind, therefore, it is the primary object of the present invention to provide a seat reclining device with a narrowest possible width.

To achieve the above-mentioned object, a seat reclining device, according to the present invention, having a base frame (10U, 10L) fixed to a side surface of a seat cushion; a reclining arm (20) fixed to a side surface of a seat back and pivotally supported by the base frame via a Taumel mechanism (30); a reclining gear (50) for eccentrically rotating the reclining arm; and a motor unit (40) with a motor output gear (44, 76) for driving the reclining gear, wherein said motor unit (40) is disposed on an inside surface of said base frame (10L) and within the seat cushion, and said motor output gear is disposed on an opposite outside surface of said base frame.

Further, an output gear (32) of the Taumel mechanism is formed in the base frame (10U); an inner-gear (31) of the Taumel mechanism is formed in the reclining arm (20) in mesh with the outer gear; and the reclining arm (20) is disposed on the inside surface of the base frame (10U) and the reclining gear (50) is disposed on an opposite outside surface of the base frame (10U).

Further, the motor output gear (44, 76) disposed on the outside surface of the base frame (10L) is covered by a bracket (11) fixed to the base frame (10L). The reclining gear (50) disposed on the outside surface of the base frame (10U) is covered by a holder plate (36).

When the motor unit includes no reduction gear mechanism therewithin, the seat reclining device further comprises a reduction gear mechanism comprising: (a) a worm gear (70) in mesh with an output shaft (70a) of said motor unit (40); (b) a worm wheel (71) in mesh with said worm gear; (c) a small diameter gear (72) fixed coaxially with said worm wheel; (d) a large diameter gear (74) in mesh with said small diameter gear, said motor output gear (76) being fixed coaxially with said large diameter gear in mesh with said reclining gear (50), said worm gear, said worm wheel, said small diameter gear and said large diameter gear being arranged on an inside surface of said base frame and said motor output gear being arranged on an opposite outside surface of said base frame.

Further, a shock absorbing member (100) is disposed between the reclining gear (50) and an eccentric axle (33) of the Taumel mechanism (30) to absorb shock generated when the seat back is brought into contact with its frontmost position stopper.

In the seat reclining device according to the present invention, since the various major parts are effectively arranged on both surfaces of the base frame to minimize the width of the device, it is possible to dispose the device elements within the seat cushion and the seat back. Therefore, the seat reclining device according to the present invention can be provided for even small-sized passanger cars.

Further, since the gears arranged on the outside surface of the base frame are covered, it is possible to effectively protect the seat cushion pad from damage due to the device gears.

Further, since the shock absorbing member is disposed near the reclining arm which generates shock, it is possible to effectively absorb shock generated when the seat back is reclined to its two frontmost and rearmost stoppers.

BRIEF DESCRIPTION OF THE DRAWINGS

The features and advantages of the seat reclining device according to the present invention over the prior art devices will be more clearly appreciated from the following description of the preferred embodiment of the invention taken in conjunction with the accompanying drawings in which like reference, numerals designate the same or similar elements or sections throughout the figures thereof and in which.

DETAILED DESCRIPTION OF THE PREFERRED EMBODIMENTS

Embodiments of the present invention will be explained with reference to the attached drawings.

Figure 1:
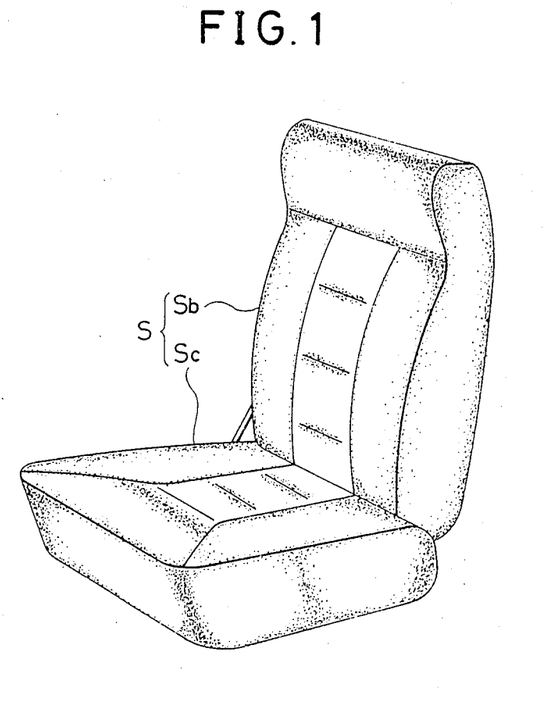
FIG. 1 is a perspective view showing a vehicle seat to which the device according to the present invention is applied.
Figure 2:
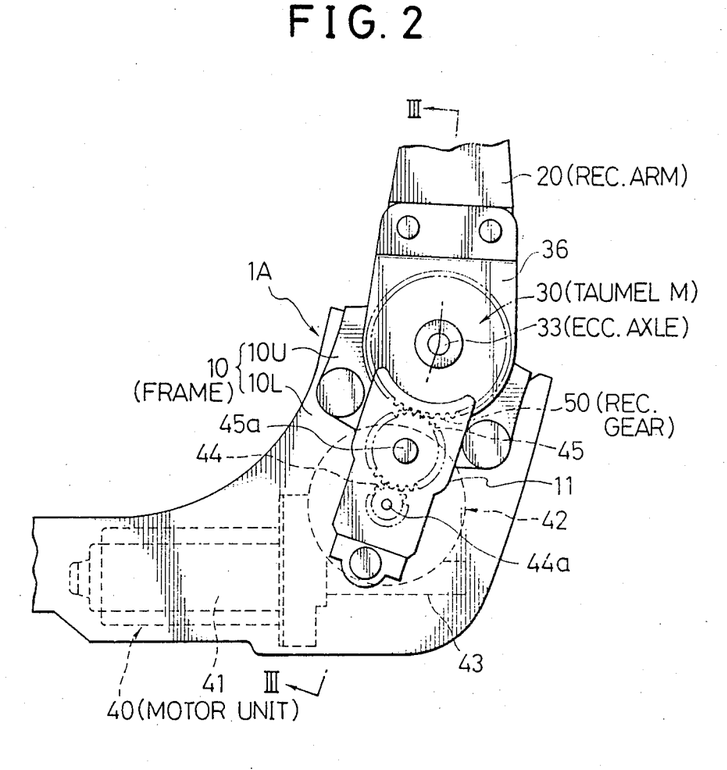
FIG. 2 is a side view showing a first embodiment of the seat reclining device according to the present invention, when seen from outside of the seat.
Figure 3:
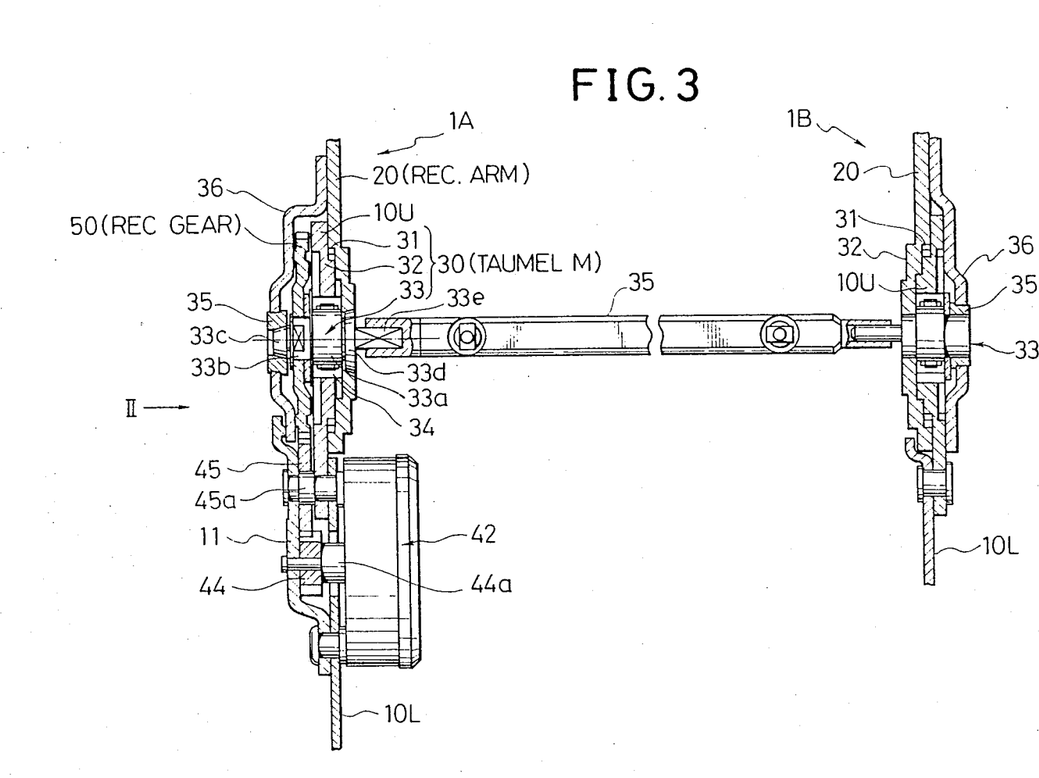
FIG. 3 is a cross-sectional view taken along the line III—III in FIG. 2.

As shown in FIGS. 1-3, a seat S is composed of a seat cushion Sc and a seat back Sb, and a seat reclining device 1 according to the present invention is arranged on both sides of and within the seat S. In the following description, the seat reclining device 1A on the motor drive-side (on the left side in FIG. 3) will be mainly explained.

The seat reclining device 1A comprises a pair of upper and lower base frames 10U and 10L both fixed to a cushion frame (not shown) fixed to the side of the seat cushion Sc; a reclining arm 20 fixed to the side of the seat back Sb and pivotally supported on the upper base frame 10U via a Taumel mechanism 30 (a planetary gear type pivotal angle adjusting mechanism); a motor unit 40 mainly including a motor 41 and a reduction gear 42 and mounted on the lower base frame 10L to drive the Taumel mechanism 30; and a reclining gear 50 fixed to an eccentric axle of the Taumel mechanism and rotated by the motor 41 of the motor unit 40.

In the first embodiment shown in FIGS. 2 and 3, the motor unit 40 comprises the motor 41, the reduction gear mechanism 42 coupled to a motor output shaft 43, a pinion gear 44 formed integral with an output shaft 44a of the reduction gear mechanism 42. Further, an idler gear 45 fixed to an idle gear axle 45a is interposed between the pinion gear 44 and the reclining gear 50.

As depicted in FIG. 3, the motor 41 and the reduction gear mechanism 42 are mounted on the inside surface of the lower base frame 10L. Further, an outer end of the output shaft 44a of the reduction gear mechanism 42 is rotatably supported by a bracket 11 fixed to the lower base frame 10L with screws. The idler gear axle 45a of the idler gear 45 is also rotatably supported between the lower base frame 10L and the bracket 11.

The Taumel mechanism 30 comprises an inner (circumferentially outside) gear 31, an outer (circumferentially inside) gear 32 and an eccentric axle 33. The inner gear 31 is formed in the reclining arm 20 by a precise emboss pressing machine. The outer gear 32 is also formed in the upper base frame 10U by a precise emboss pressing machine. Further, the number of teeth of the outer gear 32 is determined at least one tooth smaller than that of the inner gear 31. In this Taumel mechanism 30, when the inner gear 31 is rotated eccentrically about the center of the outer gear 32, the mesh position between the two gears 31 and 32 rotates tooth by tooth in either direction, so that the reclining arm 20 formed with the inner gear 31 is pivoted very slowly about the outer gear 32.

The eccentric axle 33 is formed with a first concentric axle portion 33a, a second concentric axle portion 33b, an outside tapered eccentric axle portion 33c, an inside tapered eccentric axle portion 33d, and a square end 33e. The large diameter concentric axle portion 33a is rotatably supported at the center of the outer gear 32 via a bearing 34. The small diameter concentric axle portion 33b is fixed to the center of the reclining gear 50. The outside tapered eccentric axle portion 33c is rotatably supported by a bearing 35 fixed to a holder plate 36. The inside tapered eccentric axle portion 33d is fixed to the center of the inner gear 31 of the reclining arm 20. The holder plate 36 fixed to the reclining arm 20 covers the upper base frame 10U, the reclining gear 50 and the eccentric axle 33.

Further, the two right and left side eccentric axles 33 are connected to each other via a connecting rod 35 by pressure fitting a square end 33e of the eccentric axle 33 into a hollow portion of the rod 35.

As shown in FIG. 3, the right side seat reclining device 1B is basically the same in structure as the left side seat reclining device 1A. However, the eccentric axle 33 is directly driven by the connecting rod 35 without providing the motor unit 40 (the motor 41 and the reduction gear 42), the pinion gear 44, the idler gear 45, the reclining gear 50, etc.

The seat reclining device 1A and 1B constructed as described above is arranged within a full-trimmed seat S composed of the seat cushion Sc and the seat back Sb.

In operation, when a driver or a passenger on the seat S turns on a switch (not shown) to rotate the motor 41, the motor power is transmitted to the reclining gear 50 via the reduction gear mechanism 42, the pinion gear 44 and the idler gear 45. Since the reclining gear 50 is fixed to the small-diameter concentric portion 33b of the eccentric axle 33, this eccentric axle 33 rotates, so that the inner gear 31 (i.e. the reclining arm 20), rotates eccentrically in mesh with the outer gear 32 (i.e. the upper base frame 10U). In this case, the engagement position between the two gears 31 and 32 rotates tooth by tooth in either direction, so that the reclining arm 20 is speed reduced and pivoted about the eccentric axle 33 in the same rotative direction of the eccentric axle 33. Further, when the eccentric axle 33 rotates counterclockwise in FIG. 2, the seat back is reclined frontward, and when clockwise, the seat back is reclined backward, for instance.

As shown in FIG. 3, the feature of the first embodiment is to minimize the width of the seat reclining device 1A or 1B. In more detail, the motor unit 40 (including the motor 41 and reduction gear mechanism 42) is disposed on the inside surface of the lower base frame 10L or in the seat cushion, and only the pinion gear 44 is disposed on the outside surface of the lower base frame 10L out of the seat cushion. In addition, the outer gear 32 is formed in the upper base frame 10U, the reclining arm 20 formed with the inner gear 31 is disposed on the inside surface of the upper base frame 10U so as to be in mesh with the outer gear 32 and the reclining gear 50 is disposed on the outside surface of the upper base frame 10U.

In addition, since the pinion gear 44 and the idler gear 45 are covered by a bracket 11 from outside, and the reclining gear 50 is also covered by the holder plate 36 also from outside, it is possible to protect the seat cushion pad from being damaged by the reclining device, in particular from the moving gears 44, 45 and 50.

FIGS. 4 to 8 show a second embodiment of the seat reclining device according to the present invention, in which a worm gear and a worm wheel are provided in place of the reduction gear mechanism 42 of the first embodiment shown in FIGS. 2 and 3.

Figure 6:
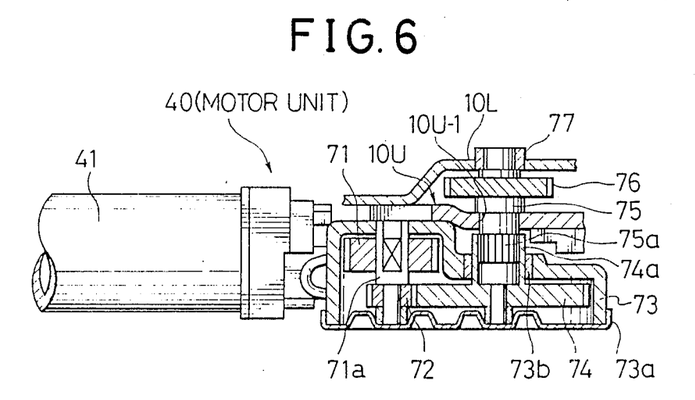
FIG. 6 is a cross-sectional view taken along the line VI—VI in FIG. 4.

In more detail, a worm gear 70 is fixed to a motor output shaft 43 of the motor 41. A worm wheel 71 fixed to a worm wheel axle 71a is in mesh with the worm gear 70. This worm wheel axle 71a is arranged perpendicular to the motor output shaft 43 and rotatably supported between a gear case 73 and a gear case cover 73a. A small diameter gear 72 fixed to the worm wheel axle 71a is in mesh with a large diameter gear 74. The large diameter gear 74 is fixed to a drive shaft 75 by fitting a boss portion 74a of the gear 74 to a serration portion 75a of the drive shaft 75. Further, this drive shaft 75 is rotatably supported between the gear case cover 73a and the lower base frame 10L via a bush 77 being rotatably supported by a bearing 73b attached to the gear case 73 and loosely supported by a hole 10U-1 of the upper base frame 10U, as shown in FIG. 6. Further, the large diameter gear 74 is also housed between the gear case 73 and a gear case cover 73a. A drive gear 76 in mesh with the reclining gear 50 is formed integral with this drive shaft 75.

Figures 7, 8:
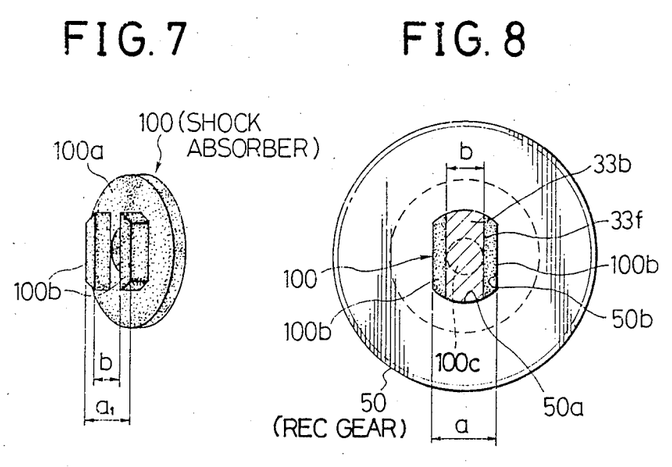
FIG. 7 is an enlarged perspective view showing a shock absorbing member.
FIG. 8 is an enlarged side view for assistance in explaining the fitting state of the shock absorbing member to a slot formed in a reclining gear.

In this second embodiment, a shock absorbing member or a damper member 100 is disposed between the eccentric axle 33 and the reclining gear 50 to reduce shock generated when the eccentric axle 33 is driven by the reclining gear 50. In more detail, as described already in the first embodiment, the eccentric axle 33 is formed with a first concentric axle portion 33a, a second concentric axle portion 33b, an outside cylindrical eccentric axle portion 33c, an inside cylindrical eccentric axle portion 33d, and a square end 33e. The above second concentric axle portion 33b is formed in roughly a square shape having two opposing flat surface portions 33f with a width b therebetween.

Further, the reclining gear 50 is formed at its center with a slot 50a having two opposing flat surface portions 50b with a width a (>b) therebetween. On the other hand, the damper member 100 made of an elastic material such as a rubber is formed with a disk portion 100a and two lug portions 100b projecting from the disk portion 100a perpendicular thereto and spaced with a space b therebetween. Further, a central hole 100c is formed at its center of the damper member 100.

In assembly, the reclining gear 50 is fitted to the second concentric axle portion 33b of the eccentric axle 33; the rubber damper member 100 is fitted to the eccentric axle 33 by inserting the two lug portions 100b into spaces formed between the second concentric axle portion 33b of the eccentric axle 33 and the central slot 50a of the reclining gear 50. In this embodiment, the outside width a 1 between the two lug portions 100b is determined a little wider than that a of the slot 50a of the reclining gear 50.

The structural features and the functional effects of the second embodiment other than those described above are substantially the same as with the first embodiment previously described. The references have been retained for similar parts which have the same functions without repeating any detailed description of them.

In this second embodiment, the motor unit 40 (i.e. motor 41) and a reduction gear mechanism (including the worm gear 70, the worm wheel 71, the small diameter gear 72 and the large diameter gear 74) are disposed on the inside surface of the upper base from 10U (as shown in FIG. 6) or within the seat cushion, and only the drive gear 76 is disposed on the outside surface of the upper base frame 10U out of the seat cushion. Further, the outer gear 32 is also formed in the upper base frame 10U, the reclining arm 20 formed with the inner gear 31 is disposed on the inside surface of the upper base frame 10U so as to be in mesh with the outer gear 32 and the reclining gear 50 is disposed on the outside surface of the upper base frame 10U, in the same way as in the first embodiment shown in FIGS. 2 and 3.

Figure 4:
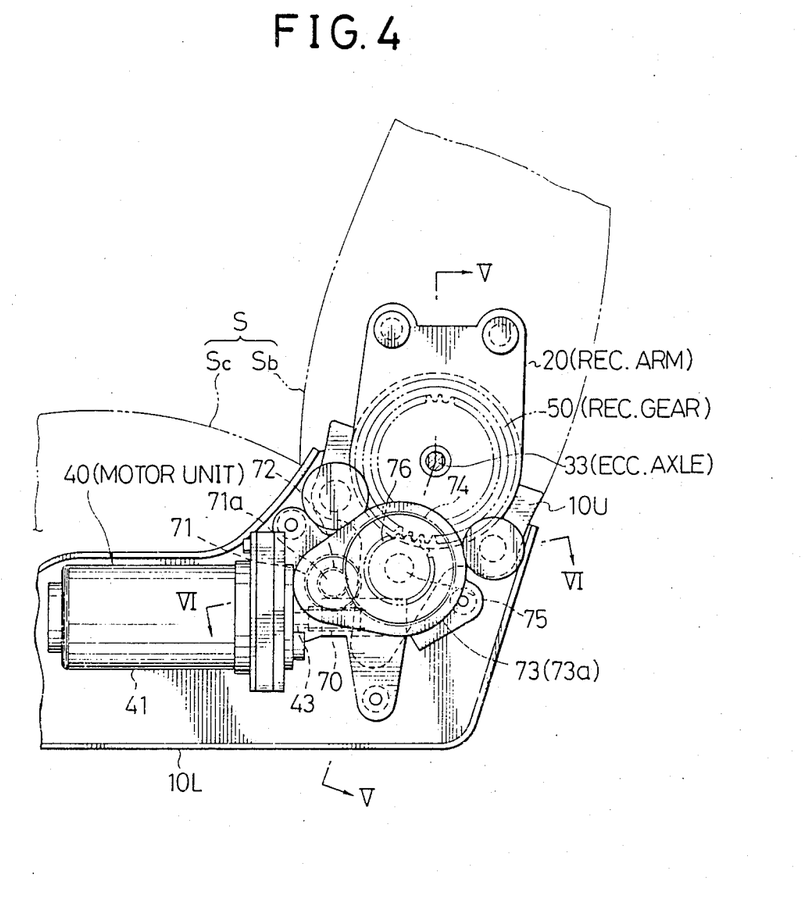
FIG. 4 is a side view showing a second embodiment of the seat reclining device according to the present invention, when seen from inside of the seat.
Figure 5:
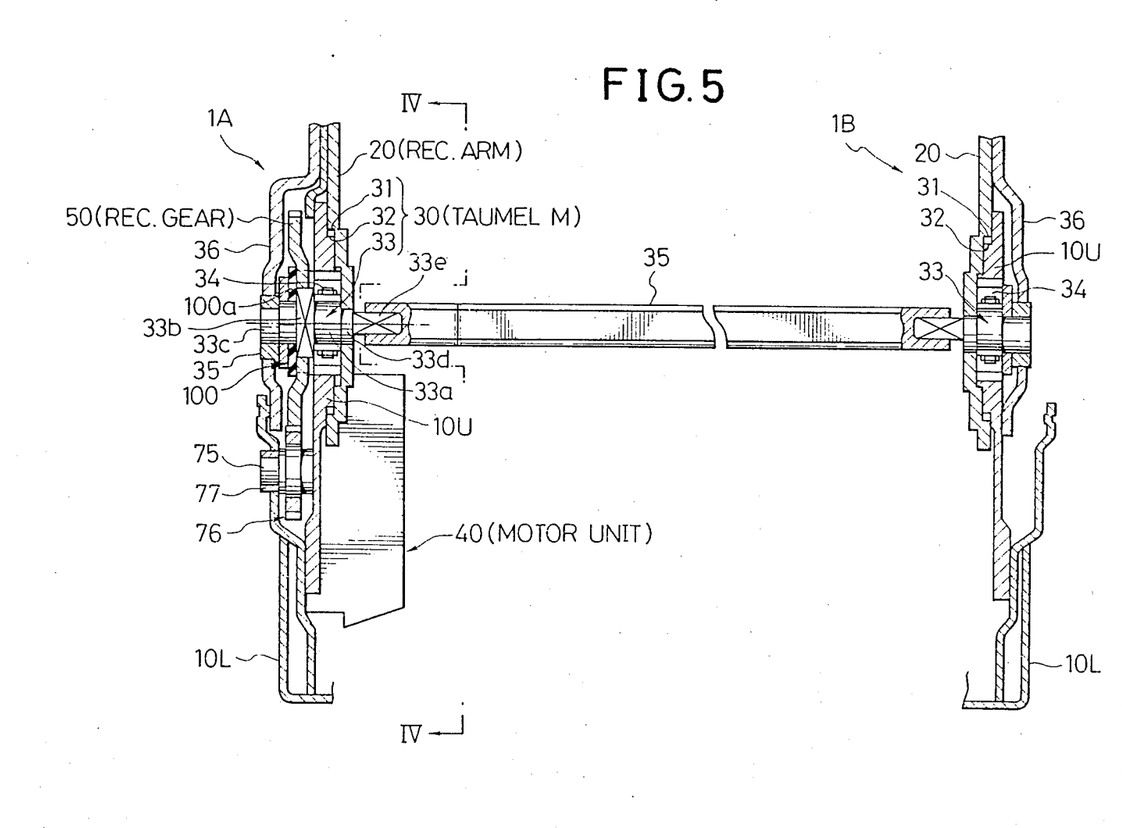
FIG. 5 is a cross-sectional view taken along the line V—V in FIG. 4.

Further, in this second embodiment since the motor unit 40 does not include a reduction gear mechanism and instead the reduction gear mechanism including the worm gear 70, the worm wheel 71, the small diameter gear 72 and the large diameter 74 is effectively arranged in series on the inside surface of the upper base frame 10U, it is possible to further minimize the width of the seat reclining device.

Further, since the drive shaft 75 of the drive gear 76 is arranged separately from the worm wheel axle 71a of the worm wheel 71 and the mutual positional relationship between the drive shaft 75 and worm wheel axle 71a can be freely determined, it is possible to design the device as small as possible by disposing the motor unit 40 in the vicinity of the Taumel mechanism 30.

Further, since the drive gear 76 fixed to the drive shaft 75 driven by the motor unit 40 via the worm mechanism 70 and 71 and two gears 72 and 74 is disposed on the inside surface of the upper base frame 10U so as to be in mesh with the reclining gear 50, it is possible to freely determine an appropriate pitch of the drive gear 76 and reclining gear 50, as compared with when the drive gear 76 is assembled together with the motor unit 40, in order to reduce abnormal gear sound produced when the drive and reclining gears 76 and 50 rotate relative to each other.

Furthermore, since the reduction ratio can be freely adjusted by changing the gear ratio of the small diameter gear 72 and the large diameter gear 74, it is possible to obtain an appropriate seat reclining speed according to the motor unit 40.

In addition, since the shock absorbing member 100 is disposed between the reclining gear 50 and the eccentric axle 33 where the speed reduction ratio is one, whenever the reclining arm 20 is moved down to a frontmost position stopper or up to a rearmost position stopper, it is possible to more effectively absorb a shock generated at the eccentric axle 33, as compared with where the shock absorbing member is disposed in the reduction gear mechanism at which reduction ratio is large. In the prior-art device, since the shock absorbing member is disposed in the reduction gear mechanism and shock is absorbed after a certain element has been rotated through an angle, there exists a problem in that the size of the shock absorbing member increases and therefore the size of the motor unit or the reduction gear mechanism increases. In this embodiment, however, there is another advantage that the size of the shock absorbing member can be minimized and simultaneously that of the motor unit or the reduction gear mechanism can be minimized.

As described above, in the seat reclining device according to the present invention, it is possible to minimize the width of the device, reduce abnormal gear sound, obtain an appropriate seat reclining speed, etc., while effectively reducing shock generated when the seat back is moved to its extreme position stoppers.

What is claimed is:

1. A seat reclining device for an automobile comprising:
   a seat having a seat cushion and a seat back;

a base frame fixed to a side surface of said seat cushion;

a reclining arm fixed to a side surface of said seat back;

A Taumel gear reduction mechanism pivotally supporting said reclining arm on said base frame, said Taumel gear reduction mechanism comprising an inner gear formed in said reclining arm, an outer gear formed in said base frame in mesh with said inner gear, and an eccentric axle mounted to said outer gear, said inner gear having at least one more tooth than said outer gear;

a reclining gear mounted to an outside surface of said base frame for driving said eccentric axle of said Taumel gear reduction mechanism for pivoting said reclining arm relative to said base frame; and a motor unit mounted to an inside surface of said base frame opposite said outside surface for driving said reclining gear.

2. The seat reclining device of claim 1, wherein said reclining arm is disposed on said inside surface of said base frame and said reclining gear is disposed on said outside surface of said base frame.

3. The seat reclining device of claim 1, further comprising a shock absorbing member disposed between said reclining gear and said eccentric axle.

4. A seat reclining device for an automobile comprising:

a seat having a seat cushion and a seat back;

a base frame mounted to a side surface of the seat cushion;

a reclining arm mounted to a side surface of the set back;

a Taumel gear reduction mechanism pivotally supporting said reclining arm on said base frame, said Taumel gear reduction mechanism comprising an inner gear formed in said reclining arm, an outer gear formed in said base frame in mesh with said inner gear, and an eccentric axle mounted to said outer gear, said inner gear having at least one more tooth than said outer gear;

reclining gear means mounted to an outside surface of said base frame for driving said eccentric axle of said Taumel gear reduction mechanism to pivot said reclining arm relative to said base frame;

motor means mounted to an inside surface of said base frame opposite said outside surface for driving said reclining gear means; and a gear mechanism for coupling said motor means with said reclining gear means, comprising;
 (a) a worm gear in mesh with an output shaft of said motor means;
 (b) a worm wheel in mesh with said worm gear;
 (c) a small diameter gear fixed coaxially with said worm wheel;
 (d) a large diameter gear in mesh with said small diameter gear, said motor output gear being fixed coaxially with said large diameter gear in mesh with said reclining gear means, said worm gear, said worm wheel, said small diameter gear and said large diameter gear being arranged on said inside surface of said base frame and said motor output gear being arranged on said outside surface of said base frame.

5. A seat reclining device for an automobile comprising:

a seat having a seat cushion and a seat back;

a base frame mounted to a side surface of the seat cushion;

a reclining arm mounted to a side surface of the seat back;

a Taumel gear reduction mechanism pivotally supporting said reclining arm on said base frame, said Taumel gear reduction mechanism comprising an inner gear formed in said reclining arm, an outer gear formed in said base frame for meshing with said inner gear, and an eccentric axle mounted to said outer gear, said inner gear having at least one more tooth than said outer gear;

reclining gear means mounted to an outside surface of said base frame for driving said eccentric axle of said Taumel gear reduction mechanism to pivot said reclining arm relative to said base frame;

motor means mounted to an inside surface of said base frame opposite said outside surface for driving said reclining gear means; and a shock absorbing member disposed between said reclining gear means and said eccentric axle, wherein said shock absorbing member is formed with a disk portion in contact with said reclining gear means and with two lug portions projecting from the disk portion perpendicular thereto for insertion into two spaces formed between said eccentric axle and a slot formed in said reclining gear means.

* * * * *